US009386603B2

(12) United States Patent
Liu et al.

(10) Patent No.: US 9,386,603 B2
(45) Date of Patent: Jul. 5, 2016

(54) RANDOM ACCESS METHOD, BASE STATION, AND USER EQUIPMENT

(71) Applicant: Huawei Technologies Co., Ltd., Shenzhen, Guangdong (CN)

(72) Inventors: Kunpeng Liu, Beijing (CN); Yuhua Chen, Shenzhen (CN); Wei Quan, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 14/460,899

(22) Filed: Aug. 15, 2014

(65) Prior Publication Data

US 2015/0003375 A1    Jan. 1, 2015

Related U.S. Application Data

(63) Continuation of application No. PCT/CN2013/071608, filed on Feb. 16, 2013.

(30) Foreign Application Priority Data

Feb. 15, 2012   (CN) .......................... 2012 1 0034106

(51) Int. Cl.
*H04W 74/08* (2009.01)
*H04L 5/00* (2006.01)
*H04W 72/00* (2009.01)
*H04W 72/08* (2009.01)
*H04W 40/00* (2009.01)

(52) U.S. Cl.
CPC ......... *H04W 74/0833* (2013.01); *H04L 5/0044* (2013.01); *H04W 40/00* (2013.01); *H04W 72/00* (2013.01); *H04W 72/08* (2013.01)

(58) Field of Classification Search
None
See application file for complete search history.

(56) References Cited

U.S. PATENT DOCUMENTS

| 2007/0054681 | A1* | 3/2007 | Suh ........................ H04W 48/12 455/502 |
| 2008/0095185 | A1* | 4/2008 | DiGirolamo .......... H04L 1/0026 370/464 |
| 2009/0088175 | A1 | 4/2009 | Pelletier et al. |
| 2010/0027485 | A1* | 2/2010 | Noh .................. H04W 74/0866 370/329 |
| 2010/0150056 | A1* | 6/2010 | Iwai ........................ H04L 5/023 370/328 |
| 2010/0296451 | A1* | 11/2010 | Li ........................ H04W 74/006 370/328 |

(Continued)

FOREIGN PATENT DOCUMENTS

| CN | 101001448 A | 7/2007 |
| CN | 101094506 A | 12/2007 |
| CN | 101810047 A | 8/2010 |
| CN | 102271415 A | 12/2011 |

(Continued)

*Primary Examiner* — Kodzovi Acolatse
(74) *Attorney, Agent, or Firm* — Leydig, Voit & Mayer, Ltd.

(57) ABSTRACT

The present invention provides a random access method, a base station, and a user equipment. The method includes: obtaining, by the UE, a PRACH sequence; and sending, by the UE, the PRACH sequence to the base station to perform random access, and carrying first information when sending the PRACH sequence so that the base station receives the first information in a random access process. In the technical solutions of the present invention, the UE sends the first information in the random access process, which improves transmission efficiency of the first information. The present invention is particularly applicable to services of small packets.

10 Claims, 14 Drawing Sheets

(56) References Cited

U.S. PATENT DOCUMENTS

2011/0013542 A1 1/2011 Yu et al.
2013/0163537 A1* 6/2013 Anderson ......... H04W 72/1284
  370/329

FOREIGN PATENT DOCUMENTS

| EP | 2536235 A1 | 12/2012 |
| WO | WO 2011004752 A1 | 1/2011 |
| WO | WO 2011099151 A1 | 8/2011 |

* cited by examiner

RANDOM ACCESS METHOD, BASE STATION, AND USER EQUIPMENT

CROSS-REFERENCE TO RELATED APPLICATIONS

This application is a continuation of International Patent Application No. PCT/CN2013/071608, filed on Feb. 16, 2013, which claims priority to Chinese Patent Application No. CN 201210034106.4, filed on Feb. 15, 2012, both of which are hereby incorporated by reference in their entireties.

TECHNICAL FIELD

The present invention relates to a mobile communications technology, and in particular, to a random access method, a base station, and a user equipment.

BACKGROUND

Currently, in applications such as machine-to-machine (M2M) communication or smartphone, services of small packets often need to be transmitted. For example, a daemon of a smartphone often initiates services of small packets whose data amount is generally less than 200 bytes. The services of small packets are characterized by small amounts of data and by being transmitted periodically or aperiodically.

Before initiating a service of small packets, a user equipment (UE) needs to perform random access. Because the services of small packets have a very small amount of data but lead to very large signaling overhead and delay in the random access process, the transmission efficiency of services of small packets is very low.

SUMMARY

Embodiments of the present invention provide a random access method, a base station, and a user equipment, which are used to improve transmission efficiency of services of small packets.

One aspect of the present invention provides a random access method, including:

obtaining, by a user equipment UE, a physical random access channel PRACH sequence; and sending, by the UE, the PRACH sequence to a base station to perform random access, and carrying first information when sending the PRACH sequence so that the base station receives the first information in a random access process.

One aspect of the present invention provides a user equipment, including:

an obtaining module, adapted to obtain a physical random access channel PRACH sequence; and a sending module, adapted to send the PRACH sequence to a base station to perform random access, and carrying first information when sending the PRACH sequence so that the base station receives the first information in a random access process.

Another aspect of the present invention provides a random access method, including:

receiving, by a base station, a physical random access channel PRACH sequence sent by a user equipment UE to perform random access; and receiving, by the base station when receiving the PRACH sequence, first information carried in the PRACH sequence, so as to receive the first information in the random access process.

Another aspect of the present invention provides a base station, including:

a first receiving module, adapted to receive a physical random access channel PRACH sequence sent by a user equipment UE to perform random access; and a second receiving module, adapted to: when the first receiving module receives the PRACH sequence, receive first information carried in the PRACH sequence, so as to receive the first information in the random access process.

In the random access method and the user equipment provided in one aspect of the present invention, the UE carries first information when sending a physical random access channel sequence to the base station so that the base station receives the first information in a random access process, where the first information may be signaling data or service data. If the first information is signaling data, by transmitting signaling data in the random access process, the present invention reduces signaling exchange, saves the signaling overhead and delay, and improves the data transmission efficiency; if the first information is service data, by transmitting service data in the random access process, the present invention makes it unnecessary to transmit the service data after completion of the signaling exchange and also improves the data transmission efficiency.

In the random access method and the base station provided in another aspect of the present invention, by collaborating with the UE provided in the present invention, the base station receives first information in a physical random access channel sequence when receiving the physical random access channel sequence sent by the UE. If the first information is signaling data, by transmitting other signaling in a random access process, the solution of the present invention reduces signaling exchange, saves the signaling overhead and delay, and improves the data transmission efficiency; if the first information is service data, by transmitting service data in the random access process, the solution of the present invention makes it unnecessary to transmit the service data after completion of the signaling exchange and also improves the data transmission efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
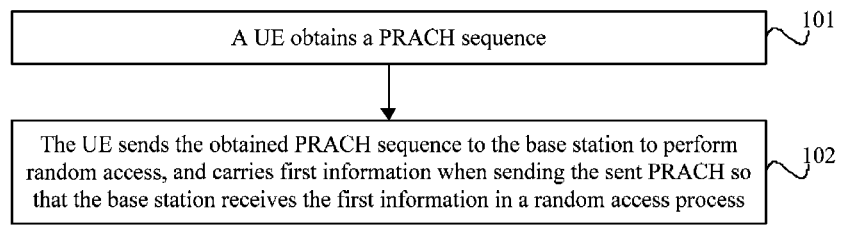
FIG. 1 is a flowchart of a random access method according to an embodiment of the present invention.

FIG. 1 is a flowchart of a random access method according to an embodiment of the present invention. As shown in FIG. 1, the method in this embodiment includes:

Step 101: A UE obtains a physical random access channel (PRACH) sequence (Preamble).

Traditional PRACH processes are categorized into a non-contention-based random access process and a contention-based random access process.

The random access method in this embodiment is applicable to both the non-contention-based random access process and the contention-based random access process.

If the random access process in this embodiment is a non-contention-based random access process, the UE selects a PRACH sequence locally at random. If the random access process in this embodiment is a contention-based random access process, the UE may obtain a PRACH sequence from PRACH scheduling information that is sent by a base station by using a physical downlink control channel (PDCCH) command (order).

Step 102: The UE sends the obtained PRACH sequence to the base station to perform random access, and carries first information when sending the PRACH sequence so that the base station receives the first information in a random access process.

The first information includes one or a combination of a radio resource control (RRC) request, a buffer status report (BSR), a shared channel, and control signaling.

In this embodiment, after obtaining the PRACH sequence, the UE sends the obtained PRACH sequence to the base station to perform random access. If another service of the UE needs to be implemented, the UE carries the first information when sending the PRACH sequence corresponding to the another service, and sends the first information to the base station so that the base station receives the first information in the random access process, which improves transmission efficiency of the another service.

Preferably, the another service is a service of small packets, that is, a service whose data amount is relatively small. For example, the another service may be: creating an RRC connection, reporting a BSR, transmitting a shared channel or transmitting control signaling, and the like. Correspondingly, the first information may be an RRC request, a BSR, a shared channel, or control signaling. In addition, the another service may be a combination of various services mentioned above. Correspondingly, the first information may be a combination of different types of information mentioned above. For example, the another service includes creating an RRC connection and reporting a BSR, and therefore, the first information includes an RRC request and a BSR.

In the prior art, if the UE is currently idle, in order to initiate the various services of small packets, the UE needs to perform uplink random access first. For example, if the UE needs to create an RRC connection, the UE needs to perform uplink random access first, and cannot create the RRC connection until the random access succeeds. For another example, if the UE needs to report a BSR, the UE needs to perform uplink random access before creating the RRC connection, and cannot report the BSR until the RRC connection is created successfully. That is, in the prior art, a service of small packets cannot be implemented until completion of random access. The access process leads to large signaling overhead and delay, and deteriorates transmission efficiency of the service of small packets.

In the random access method provided in this embodiment, the PRACH sequence sent by the UE to the base station carries the first information corresponding to other services, so that the UE can receive the first information in the random access process, which improves transmission efficiency of the first information. If the first information is signaling data such as an RRC request and control signaling, the method provided in this embodiment can transmit multiple pieces of signaling in a single exchange process, which reduces signaling exchange, saves the signaling overhead and transmission delay, improves signaling data transmission efficiency, further reduces signaling exchange, and improves transmission efficiency of other signaling or service data. If the first information is service data such as a shared channel, the method provided in this embodiment sends the service data to the base station in the random access process, which makes it unnecessary to transmit the service data after completion of the signaling exchange in the random access process, and improves service data transmission efficiency.

Optionally, before obtaining the PRACH sequence, the UE receives the PRACH configuration information that is sent by the base station and intended for use when the UE carries the first information when sending the PRACH sequence. Correspondingly, the UE obtains the PRACH sequence according to the received configuration information.

Optionally, a detailed process of the UE carries the first information when sending the PRACH sequence so that the base station receives the first information in the random access process is: The UE multiplexes the first information and the PRACH sequence, sends a multiplexing result to the base station so that the base station receives the first information in the random access process.

Optionally, before multiplexing the first information and the PRACH sequence, the UE may perform at least one of cyclical redundancy check (CRC) check bit addition, channel coding, scrambling, and modulation for the first information.

Optionally, after multiplexing the first information and the PRACH sequence, the UE may perform at least one of orthogonal code spreading, discrete Fourier transformation (DFT), resource mapping, inverse fast Fourier transformation (IFFT), and cyclic prefix (CP) addition for the multiplexing result of the first information and the PRACH sequence, and then send a result of the at least one operation for the multiplexing result to the base station so that the base station receives the first information in the random access process.

Preferably, the multiplexing, by the UE, the first information and the PRACH sequence includes: multiplying or convolving, by the UE, the first information and the PRACH sequence; or, performing, by the UE, resource configuration for the first information according to the PRACH configuration information.

For example, the UE may modulate the first information first to generate a modulated symbol, and then the UE multiplies or convolves the modulated symbol and the PRACH sequence together correspondingly to obtain a multiplexing result. The UE performs resource mapping for the multiplexing result, and then sends it to the base station so that the base station receives the first information in the random access process.

Optionally, before modulating the first information to generate the modulated symbol, the UE may perform channel coding for the first information. Correspondingly, the UE modulates the channel-coded first information to generate the modulated symbol.

Optionally, before performing channel coding for the first information, the UE may add a CRC check bit to the first information. Correspondingly, the UE performs channel coding for the first information with the added CRC check bit.

Optionally, after performing channel coding for the first information with the added CRC check bit and before modulating, the UE may scramble the channel-coded first information. Correspondingly, the UE modulates the scrambled first information to generate the modulated symbol.

Optionally, after performing resource mapping for the processing result and before sending it to the base station, the UE may perform IFFT transformation for the resource mapping result, and then add a cyclic prefix to the IFFT transformation result.

Optionally, the UE adds a cyclic prefix, which is different from those of other IFFT transformation results, before at least one IFFT transformation result.

Preferably, the UE may add a first cyclic prefix before a first IFFT transformation result, and add no cyclic prefix before other IFFT transformation results; or, the UE may add a first cyclic prefix before a first IFFT transformation result, and add a second cyclic prefix before other IFFT transformation results respectively, where the first cyclic prefix and the second cyclic prefix have different lengths.

Optionally, after modulating the first information to generate the modulated symbol, the UE may perform orthogonal code spreading for the modulated symbol. Alternatively, after multiplying or convolving the modulated symbol and the PRACH sequence together correspondingly to obtain a multiplexing result, the UE performs orthogonal code spreading for the obtained multiplexing result. Alternatively, the UE performs orthogonal code spreading for the IFFT transformation result after performing IFFT transformation for the resource mapping result.

Optionally, the UE may perform resource mapping for the multiplexing result in a frequency domain first and in a time domain later. For example, in the frequency domain, the UE may map the multiplexing result onto discontinuous subcarriers. Preferably, the UE may map the multiplexing result onto at least one discontinuous subcarrier in a frequency hopping manner. In the time domain, the UE may map the processing result onto one timeslot, one subframe, or multiple subframes, where the multiple subframes are multiple continuous subframes or multiple subframes that are at least one subframe apart.

Optionally, the multiplying, by the UE, the modulated symbol and the PRACH sequence together correspondingly, includes: if the PRACH sequence in a specific resource includes multiple same PRACH sequences (that is, multiple same PRACH sequences are employed), multiplying, by the UE, each modulated symbol by one PRACH sequence in the multiple same PRACH sequences; or, if the PRACH sequence in a specific resource includes multiple different PRACH sequences (that is, multiple different PRACH sequences are employed), multiplying, by the UE, each modulated symbol by one PRACH sequence in the multiple different PRACH sequences; or, if the PRACH sequence in a specific resource includes multiple different PRACH sequences and at least one PRACH sequence is not multiplied by the modulated symbol, multiplying, by the UE, each modulated symbol by one PRACH sequence in the multiple different PRACH sequences, where the one PRACH sequence is one of other PRACH sequences than the PRACH sequences that are not multiplied by the modulated symbol, where the specific resource is a timeslot, a subframe, or multiple subframes, where the multiple subframes are multiple continuous subframes or multiple subframes that are at least one subframe apart.

Preferably, a first PRACH sequence and a last PRACH sequence in the multiple different PRACH sequences are not multiplied by the modulated symbol.

Optionally, the process of the UE carrying the first information when sending the PRACH sequence so that the base station receives the first information in the random access process includes: modulating, by the UE, the first information to generate a modulated symbol; performing, by the UE, resource mapping for the modulated symbol according to the PRACH configuration information; and, sending, by the UE, the PRACH sequence and the modulated symbol together to the base station so that the base station receives the first information in the random access process, where, the PRACH configuration includes the PRACH sequence and/or resource mapping information of the PRACH sequence.

Optionally, the performing, by the UE, resource mapping for the modulated symbol according to PRACH configuration information includes: determining, by the UE, a mapping start point of the modulated symbol in a time domain and/or a frequency domain according to the PRACH sequence and the resource mapping information of the PRACH sequence, and then performing resource mapping for the modulated symbol in the time domain and/or the frequency domain according to the determined mapping start point in the time domain and/or the frequency domain.

Optionally, in the time domain, the UE determines that an end time point of a subframe mapped from the PRACH sequence is a mapping start point of the modulated symbol in the time domain, and then maps the modulated symbol onto at least two subframes; or, the UE determines that a time point at a specified interval after a subframe mapped from the PRACH sequence is a mapping start point of the modulated symbol in the time domain, and then maps the modulated symbol onto at least one subframe; or, the UE determines that an end time point of a subframe mapped from the PRACH sequence is a mapping start point of the modulated symbol in the time domain, and then maps the modulated symbol and the PRACH sequence onto the same subframe.

Optionally, the process of the UE carrying the first information when sending the PRACH sequence so that the base station receives the first information in the random access process includes: mapping, by the UE, a status of the first information to a format of the PRACH sequence, and expressing the first information by using the format of the PRACH sequence.

Further, before the UE carries the first information when sending the PRACH sequence so that the base station receives the first information in the random access process, the UE determines whether the data amount of the first information is less than a preset threshold; and if the UE determines that the data amount of the first information is less than the preset threshold, the UE performs the operation of carrying the first information when sending the PRACH sequence so that the base station receives the first information in the random access process.

The UE may determine the data amount of the first information on its own initiative according to the PRACH configuration. Therefore, the UE further carries the data amount of the first information when sending the PRACH sequence so that the base station knows the size of the first information and can receive the first information successfully.

Further, after sending, by the UE, the PRACH sequence to a base station to perform random access, and carrying first information when sending the PRACH sequence, so that the base station receives the first information in a random access process, the method may further include at most two of the following operations:

receiving, by the UE, a random access response (RAR) sent by the base station;

initiating, by the UE, a scheduling transmission process to the base station to transmit data; and receiving, by the UE, a random access contention success message sent by the base station.

The following embodiment of the present invention describes detailed implementation of transmitting the first information in a contention-based random access process.

Figure 2A:
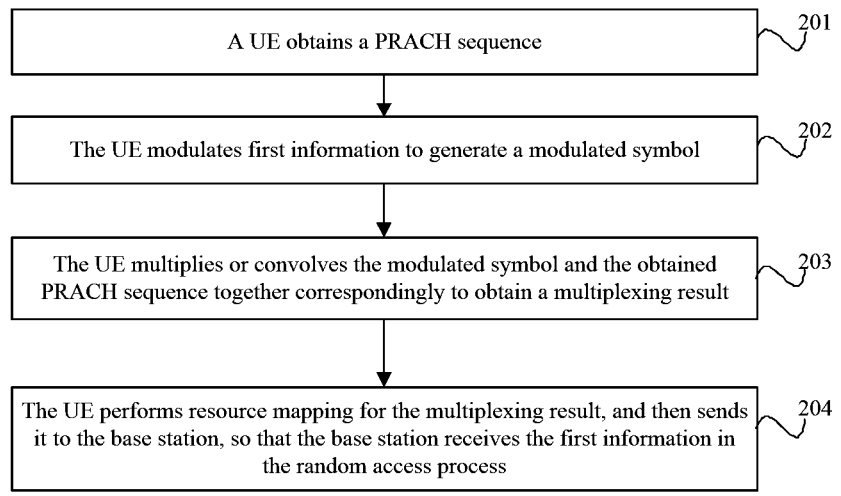
FIG. 2A is a flowchart of a contention-based random access method according to an embodiment of the present invention.

FIG. 2A is a flowchart of a contention-based random access method according to an embodiment of the present invention. As shown in FIG. 2A, the method in this embodiment includes:

Step 201: A UE obtains a PRACH sequence.

For a contention-based random access method, step 201 mainly means that the UE selects or generates the PRACH sequence locally at random. For example, the UE receives PRACH configuration information delivered by a base station, where the PRACH configuration information mainly includes an index required by the UE for generating a PRACH sequence. Then the UE selects an index in the PRACH configuration information, generates a corresponding PRACH sequence according to the index, or selects a PRACH sequence corresponding to the index among existing PRACH sequences according to the index.

In this embodiment, the UE may obtain one PRACH sequence or multiple PRACH sequences.

In this embodiment, the length of the PRACH sequence obtained by the UE may be fixed or not. If the length is not fixed, the UE may configure the length of the PRACH sequence before obtaining the PRACH sequence, that is, predetermine the length of the PRACH sequence. For example, the UE may receive higher layer signaling, dynamic signaling, a broadcast message, or the like from the base station, and configure the length of the PRACH sequence as indicated by the higher layer signaling, the dynamic signaling, or the broadcast message. Then the base station obtains the PRACH sequence of the configured length.

Step 202: The UE modulates first information to generate a modulated symbol.

In this embodiment, the UE implements other services at the same time when performing contention-based random access. In this embodiment, the data of other services implemented by the UE at the same time is recorded as first information. For example, the first information may be one or a combination of an RRC request, a BSR, a shared channel, and control signaling.

In this embodiment, the UE determines the first information according to the implemented services. After determining the first information, the UE modulates the first information to generate a modulated symbol. The UE may modulate the first information by using quadrature phase shift keying (QPSK), 16-symbol quadrature amplitude modulation (QAM) that is known as 16QAM, or 64-symbol quadrature amplitude modulation (64QAM), or a similar modulation scheme, so as to generate the modulated symbol. In addition, the UE may map the PRACH configuration and modulation scheme, that is, use different modulation schemes under different PRACH configuration conditions. Therefore, the UE may obtain the corresponding modulation scheme according to the PRACH configuration, and then modulate the first information by using the obtained modulation scheme, so as to generate the modulated symbol, where, the PRACH configuration mainly includes the PRACH sequence used in the random access and/or resource mapping information of the PRACH sequence. The resource mapping information of the PRACH sequence includes the mapping information of the PRACH sequence in a time domain, for example, information such as occupied timeslots and subframes, and includes the mapping information in a frequency domain, for example, information such as occupied subcarriers.

Step 203: The UE multiplies or convolves the modulated symbol and the obtained PRACH sequence together correspondingly to obtain a multiplexing result.

In this embodiment, after obtaining the modulated symbol as a result of modulating the first information, the UE multiplies or convolves each modulated symbol and the obtained PRACH sequence together correspondingly so that the PRACH sequence also carries the first information. This implementation manner is equivalent to code division multiplexing for the first information and the PRACH sequence.

In this embodiment, the number of PRACH sequences obtained by the UE may be one or more. Each modulated symbol may be multiplied by the same PRACH sequence or multiplied by different PRACH sequences.

For example, it is assumed that M modulated symbols are obtained as a result of modulating the first information: y1, y2, y3, . . . , and yM. The result of multiplying the PRACH sequence by each modulated symbol y1, y2, y3, . . . , and yM is zc1, zc2, . . . , zcM.

If the UE selects a PRACH sequence, multiple same PRACH sequences need to be applied on a specific resource. Correspondingly, the UE multiplies each modulated symbol by one PRACH sequence in the multiple same PRACH sequences, that is, zc1, zc2, . . . , and zcM are the same.

If the UE selects multiple different PRACH sequences, the multiple different PRACH sequences may be used on a specific resource. Correspondingly, the UE may multiply each modulated symbol by one PRACH sequence in the multiple different PRACH sequences. In this implementation manner, it is necessary to ensure that each PRACH sequence in the multiple PRACH sequences is multiplied by a modulated symbol. In this case, zc1, zc2, . . . , and zcM may be the same as or different from each other. For example, if the number of multiple different PRACH sequences selected by the UE is equal to the number of modulated symbols, zc1, zc2, . . . , and zcM are different from each other. If the number of multiple different PRACH sequences selected by the UE is less than the number of modulated symbols, some of zc1, zc2, . . . , and zcM are the same and others are different from each other. For example, zc1 and zc2 may be the same PRACH sequence, and zc3, zc4, and zc6 may be the same PRACH sequence; zc2, zc7, and zcM may be different PRACH sequences, and the like.

In addition, if the UE selects multiple different PRACH sequences, multiple different PRACH sequences may be used on a specific resource, and it is necessary to ensure that at least one PRACH sequence is not multiplied by the modulated symbol. Correspondingly, the UE may multiply each modulated symbol by one PRACH sequence in the multiple different PRACH sequences, where the one PRACH sequence is one of other PRACH sequences than the PRACH sequences that are not multiplied by the modulated symbol. In this case, the number of PRACH sequences selected by the UE is not limited so long as at least one PRACH sequence is not multiplied by any modulated symbol. The PRACH sequence multiplied by one modulated symbol may be the same as or different from the PRACH sequence multiplied by another modulated symbol. That is, zc1, zc2, . . . , and zcM may be the same as or different from each other. In this implementation manner, at least one PRACH sequence does not participate in carrying the first information so that the base station can perform channel estimation by using the PRACH sequence that does not carry the first information.

Preferably, a first PRACH sequence and a last PRACH sequence in the multiple different PRACH sequences may be not multiplied by any modulated symbol, that is, the first PRACH sequence and the last PRACH sequence are not used for carrying the first information. This implementation manner helps the base station to perform an interpolation operation for other PRACH sequences by using the first PRACH sequence and the last PRACH sequence, and facilitates channel estimation.

The first PRACH sequence and the last PRACH sequence are termed with reference to the order of the UE sending the PRACH sequence. That is, the PRACH sequence first sent by the UE is the first PRACH sequence, and the PRACH sequence last sent by the UE is the last PRACH sequence.

The specific resource may be a timeslot, a subframe, or multiple subframes, where the multiple subframes may be multiple continuous subframes or multiple subframes that are at least one subframe apart. That is, the multiple subframes may be continuous or discontinuous. In addition, the specific resource may also be a frequency domain resource such as at least one subcarrier.

Step 204: The UE performs resource mapping for the multiplexing result, and then sends it to the base station so that the base station receives the first information in a random access process.

A result of multiplying or convolving a modulated symbol and a PRACH sequence together is a multiplexing result. In this way, the UE obtains multiple multiplexing results.

In step 204, the UE may perform resource mapping for the multiple multiplexing results in a frequency domain first and in a time domain later.

Specifically, the UE performs resource mapping for the multiple multiplexing results successively. From the perspective of one result (that is, one multiplexing result) of multiplying or convolving a modulated symbol and a PRACH sequence, the resource mapping performed by the UE for the multiplexing result is resource mapping in the frequency domain; from the perspective of results (that is, two multiplexing results) of multiplying or convolving two consecutive modulated symbols and a PRACH sequence, the resource mapping performed by the UE for two consecutive multiplexing results is resource mapping in the time domain.

Optionally, in the time domain, the UE may map multiple multiplexing results onto one timeslot (that is, a half subframe), one subframe, or multiple subframes, where the multiple subframes may be multiple continuous subframes or multiple subframes that are at least one subframe apart.

Figure 2B:
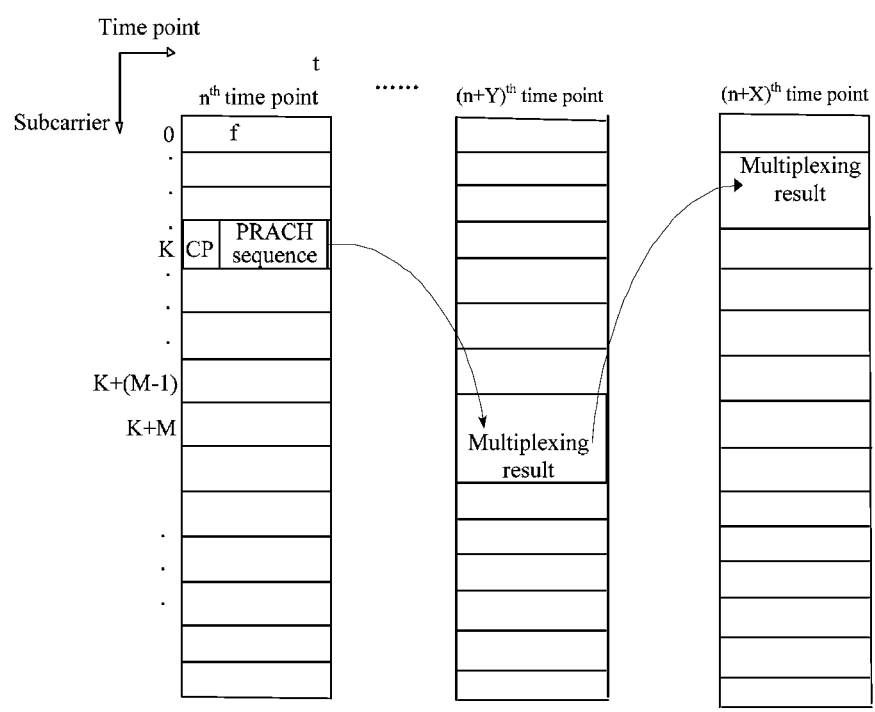
FIG. 2B is a schematic diagram of performing resource mapping in a frequency hopping manner according to an embodiment of the present invention.

In the frequency domain, the UE may map the multiplexing result onto discontinuous subcarriers. Preferably, the UE may map multiple multiplexing results onto at least one discontinuous subcarrier in a frequency hopping manner. The mapping in a frequency hopping manner means that the frequency domain resources for mapping the multiplexing results at different time points according to certain rules have different locations. As shown in FIG. 2B, the multiplexing result of multiplying or convolving the modulated symbol and the PRACH sequence together at the $n^{th}$ time point is mapped onto the $k^{th}$ subcarrier, the multiplexing result of multiplying or convolving the modulated symbol and the PRACH sequence together at the $(n+Y)^{th}$ time point is mapped onto the $(K+(M-1))^{th}$ and the $(K+M)^{th}$ subcarriers, and the multiplexing result of multiplying or convolving the modulated symbol and the PRACH sequence together at the $(n+X)^{th}$ time point is mapped onto the first and the second subcarriers.

In step 204, after performing resource mapping for the result of multiplying or convolving the modulated symbol and the PRACH sequence together, the UE may perform IFFT for the resource mapping result, and then add a CP to the IFFT transformation result and send the result to the base station.

Specifically, the UE performs IFFT transformation for the result of multiplying or convolving each modulated symbol and the PRACH sequence together to obtain multiple IFFT transformation results (each IFFT transformation result is actually a sequence).

Figure 2C:
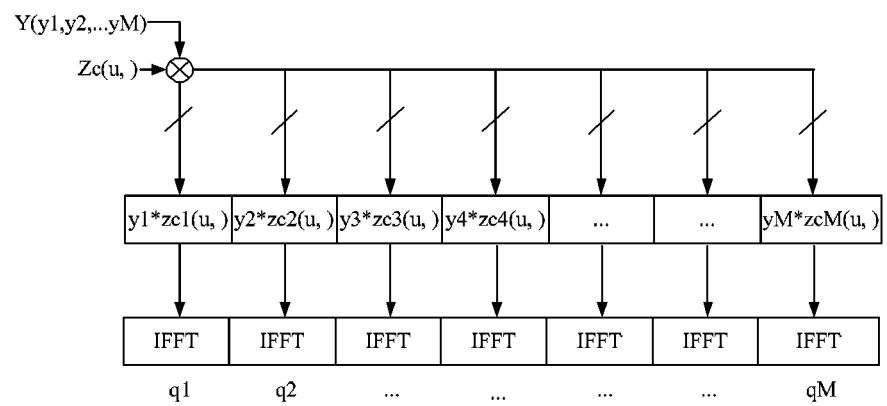
FIG. 2C is a schematic diagram of IFFT transformation according to an embodiment of the present invention.

FIG. 2C is a schematic diagram of step 203 and step 204, in which the modulated symbols y1, y2, y3, . . . , and yM are processed to obtain multiple IFFT transformation results.

The UE's adding a CP to the IFFT transformation result may refer to adding one or more CPs.

A preferred implementation manner of the UE adding a CP to the IFFT transformation result is: The UE adds a CP, which is different from those of other IFFT transformation results, before at least one IFFT transformation result. In other words, after the UE adds the CP to the IFFT transformation result, at least one IFFT transformation result needs to exist whose added CP is different from those of other IFFT transformation results.

Figure 2D:
FIG. 2D is a schematic diagram of adding a CP according to an embodiment of the present invention.

For example, a preferred implementation manner of adding a CP includes: adding, by the UE, a first CP before a first IFFT transformation result, and adding no CP before other IFFT transformation results. FIG. 2D is a schematic diagram of the implementation manner.

Figure 2E:
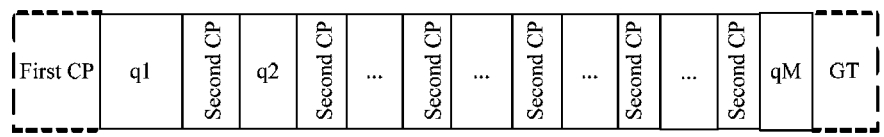
FIG. 2E is another schematic diagram of adding a CP according to an embodiment of the present invention.

Another preferred implementation manner of adding a CP includes: adding, by the UE, the first CP before the first IFFT transformation result, and adding a second CP before other IFFT transformation results respectively. The first CP and the second CP have the same or different lengths. Preferably, the first CP is longer than the second CP. FIG. 2E is a schematic diagram of the implementation manner.

In FIG. 2C, FIG. 2D, and FIG. 2E, q1, q2, . . . , and qM represent an IFFT transformation result respectively, and the GT after qM represents a guard interval.

In this step, steps 202 to 204 may be regarded as a specific implementation manner of step 102.

In this embodiment, the UE multiplies or convolves the modulated symbol derived from modulation of the first information and the selected PRACH sequence together correspondingly, and therefore, the PRACH sequence also carries the first information, the PRACH sequence sent to the base station also carries the first information, and the UE can receive the first information in a random access process, which improves transmission efficiency of the first information. This implementation manner is easy to implement.

Figure 3A:
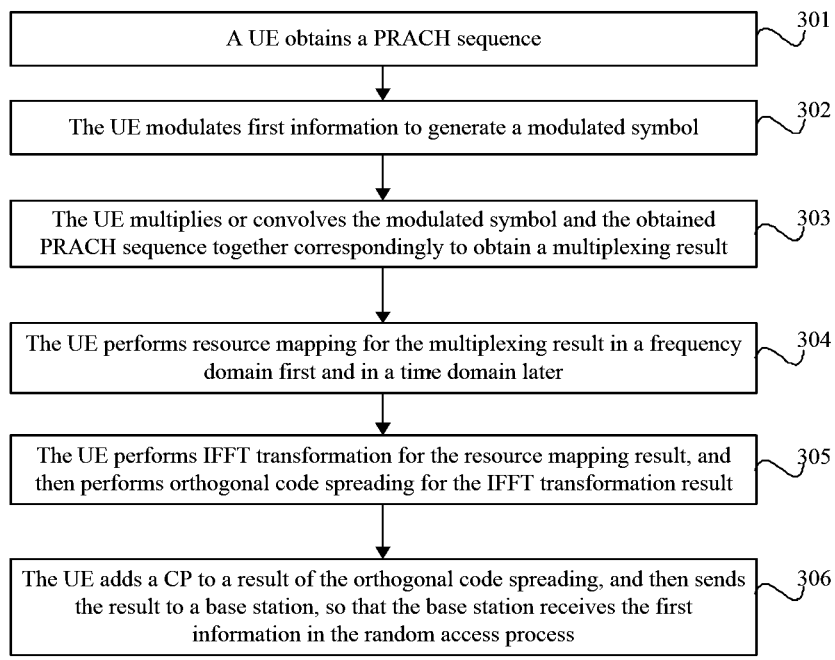
FIG. 3A is a flowchart of a contention-based random access method according to another embodiment of the present invention.

FIG. 3A is a flowchart of a contention-based random access method according to another embodiment of the present invention. This embodiment may be implemented based on the embodiment shown in FIG. 2A. As shown in FIG. 3A, the method in this embodiment includes:

Step 301: The UE obtains the PRACH sequence.

For this step, reference may be made to the description about step 201, and no repeated description is given here any further.

Step 302: The UE modulates the first information to generate the modulated symbol.

Step 303: The UE multiplies or convolves the modulated symbol and the obtained PRACH sequence together correspondingly to obtain the multiplexing result.

For step 302 and step 303, reference may be made to the descriptions about step 202 and step 203, and no repeated description is given here any further.

Step 304: The UE performs the resource mapping for the multiplexing result in the frequency domain first and in the time domain later.

Step 305: The UE performs the IFFT transformation for the resource mapping result, and then performs orthogonal code spreading for the IFFT transformation result.

In this embodiment, after performing the IFFT transformation for the resource mapping result, the UE further performs the orthogonal code spreading for the IFFT transformation result, that is, multiplies each IFFT transformation result by an orthogonal code. This can multiply more users, and help improve the resource usage rate.

Figure 3B:
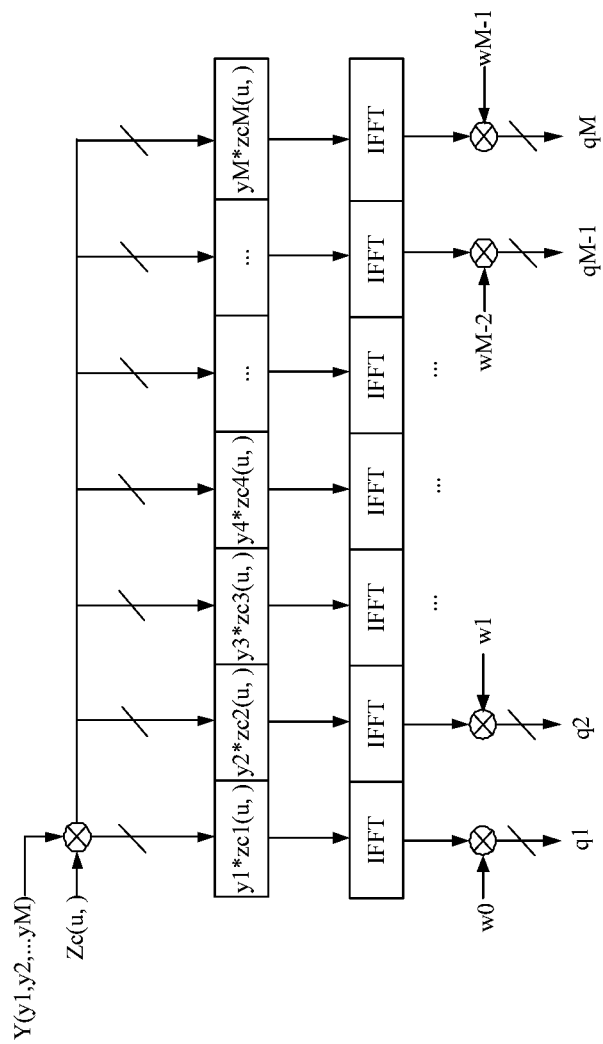
FIG. 3B is a schematic diagram of performing orthogonal code spreading for an IFFT transformation result according to another embodiment of the present invention.

Based on FIG. 2B, FIG. 3B is a schematic diagram of performing orthogonal code spreading for an IFFT transformation result. As shown in FIG. 3B, q1, q2, . . . , qM−1, and qM are multiplied by orthogonal codes w0, w1, . . . , wM−2, and wM−1 respectively.

In this embodiment, the UE may use an orthogonal code sequence whose length is the same as the number of the IFFT transformation results. For example, the orthogonal codes w0, w1, . . . , wM−2, and wM−1 are different from each other, and make up an orthogonal sequence whose length is M.

In addition, in this embodiment, the UE may use an orthogonal code sequence whose length is less than the number of the IFFT transformation results. Therefore, the UE may perform the orthogonal code spreading for the IFFT transformation result by repeatedly using the orthogonal code. For example, the UE uses an orthogonal code sequence whose length is 2, that is, an orthogonal code sequence that includes two orthogonal codes denoted by Wa and Wb, where Wa and Wb are column vectors whose length is 2, and wa, wb, wc, and wd are elements in the two column vectors. Therefore, w0 and w1 for multiplying by q1 and q2 are wa and wb respectively, w2 and w3 for multiplying by q3 and q4 are wc and wd, . . . , and, wM−2 and wM−1 for multiplying by qM−1 and qM are wa and wb respectively.

Step 306: The UE adds a CP to a result of the orthogonal code spreading, and then sends the result to the base station so that the base station receives the first information in the random access process.

Based on step 305, in this embodiment, the UE does not add a CP to the result of the IFFT transformation, but adds a CP to the result of the orthogonal code spreading.

Step 304 to step 306 may be regarded as another specific implementation manner of step 204. For descriptions about other relevant operations, reference may be made to the description about step 204, and no repeated description is given here any further.

In this embodiment, steps 302 to 306 may be regarded as a specific implementation manner of step 102.

Figure 3C:
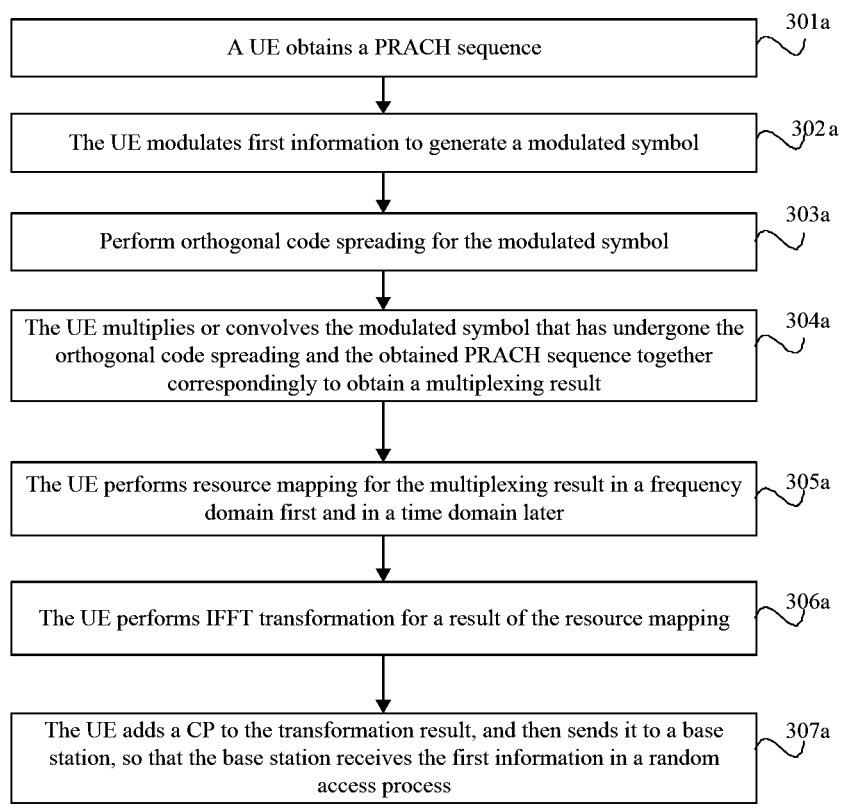
FIG. 3C is a flowchart of a contention-based random access method according to another embodiment of the present invention.

It should be noted that the UE may not only perform orthogonal code spreading for the IFFT transformation result, but also modulate the first modulated symbol, and, after generating a modulated symbol, perform orthogonal code spreading for the modulated symbol, that is, multiply each modulated symbol by the orthogonal code directly. As shown in FIG. 3C, the procedure of this implementation manner includes steps 301a to 307a. Steps 301a to 307a are similar to steps 301 to 306, and are not detailed here any further.

Figure 3D:
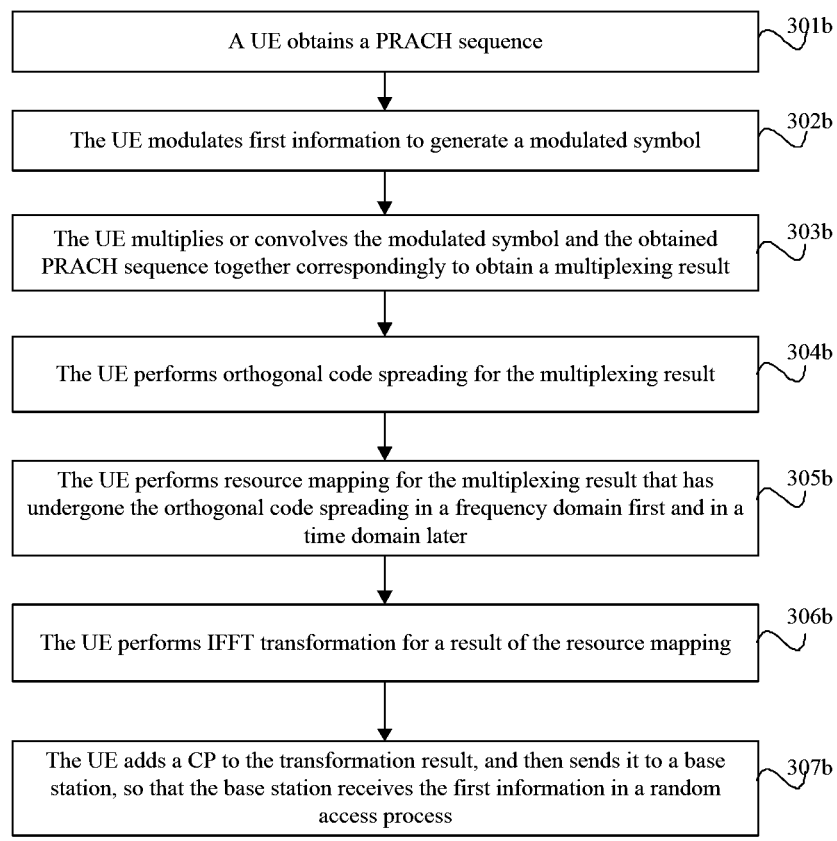
FIG. 3D is a flowchart of a contention-based random access method according to another embodiment of the present invention.

In addition, after multiplying or convolving the modulated symbol and the PRACH sequence together correspondingly to obtain a multiplexing result, the UE may perform orthogonal code spreading for the multiplexing result, that is, multiply each multiplexing result by the orthogonal code directly. As shown in FIG. 3D, the procedure of this implementation manner includes steps 301b to 307b. Steps 301b to 307b are similar to steps 301 to 306, and are not detailed here any further.

In the embodiments shown in FIG. 3A to FIG. 3C, the UE performs orthogonal code spreading for the IFFT transformation result, the modulated symbol, or the multiplexing result, which helps multiplex multiple users and improves the resource usage rate.

Figure 4:
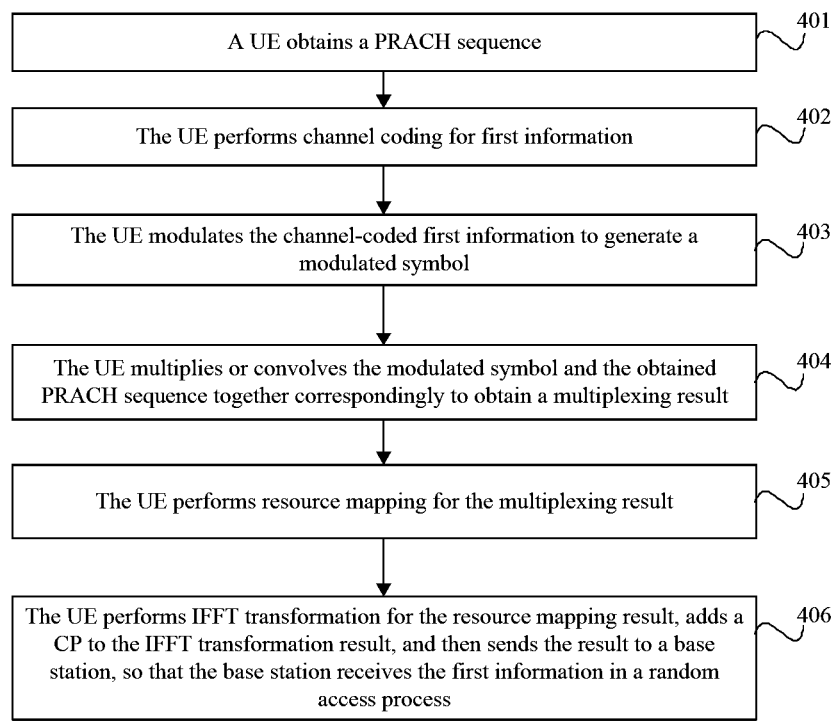
FIG. 4 is a flowchart of a contention-based random access method according to another embodiment of the present invention.

FIG. 4 is a flowchart of a contention-based random access method according to another embodiment of the present invention. This embodiment may be implemented based on any embodiment shown in FIG. 2A, FIG. 3A, FIG. 3C, and FIG. 3D. The following description assumes that this embodiment is implemented based on the embodiment shown in FIG. 2A. As shown in FIG. 4, the method in this embodiment includes:

Step 401: The UE obtains the PRACH sequence.

For this step, reference may be made to the description about step 201, and no repeated description is given here any further. Step 402: The UE performs channel coding for the first information.

In this embodiment, the UE implements other services at the same time when performing contention-based random access. In this embodiment, the data of other services implemented by the UE at the same time is recorded as first information. For example, the first information may be one or a combination of an RRC request, a BSR, a shared channel, and control signaling.

In this embodiment, the UE determines the first information according to the implemented services. After determining the first information, the UE performs channel coding for the first information, which improves transmission efficiency.

The UE performs channel coding for the first information by means of RM coding (Reed Muller coding), diagonal modulation and coding, convolutional coding, or Turbo coding.

Optionally, according to the channel coding method applied, the UE may add a CRC check bit to the first information before performing channel coding for the first information.

Step 403: The UE modulates the channel-coded first information to generate the modulated symbol.

In this embodiment, the UE may modulate, by using a modulation scheme such as QPSK, 16QAM, or 64QAM, or a modulation scheme corresponding to the PRACH configuration, the first information after the first information is channel-coded or after a CRC check bit is added to the first information and the first information is channel-coded, so as to generate the modulated symbol.

Step 404: The UE multiplies or convolves the modulated symbol and the obtained PRACH sequence together correspondingly to obtain the multiplexing result.

For step 404, reference may be made to the description about step 203.

Step 405: The UE performs the resource mapping for the multiplexing result.

Step 406: The UE performs the IFFT transformation for the resource mapping result, adds the CP to the IFFT transformation result, and then sends the result to the base station so that the base station receives the first information in the random access process.

For step 405 and step 406, reference may be made to the description about step 204, and no repeated description is given here any further.

In this step, steps 402 to 406 may be regarded as a specific implementation manner of step 102.

In this embodiment, the UE performs channel coding before modulating the first information or adding a CRC check bit, which ensures correct transmission of the first information and improves transmission quality of the first information.

Figure 5:
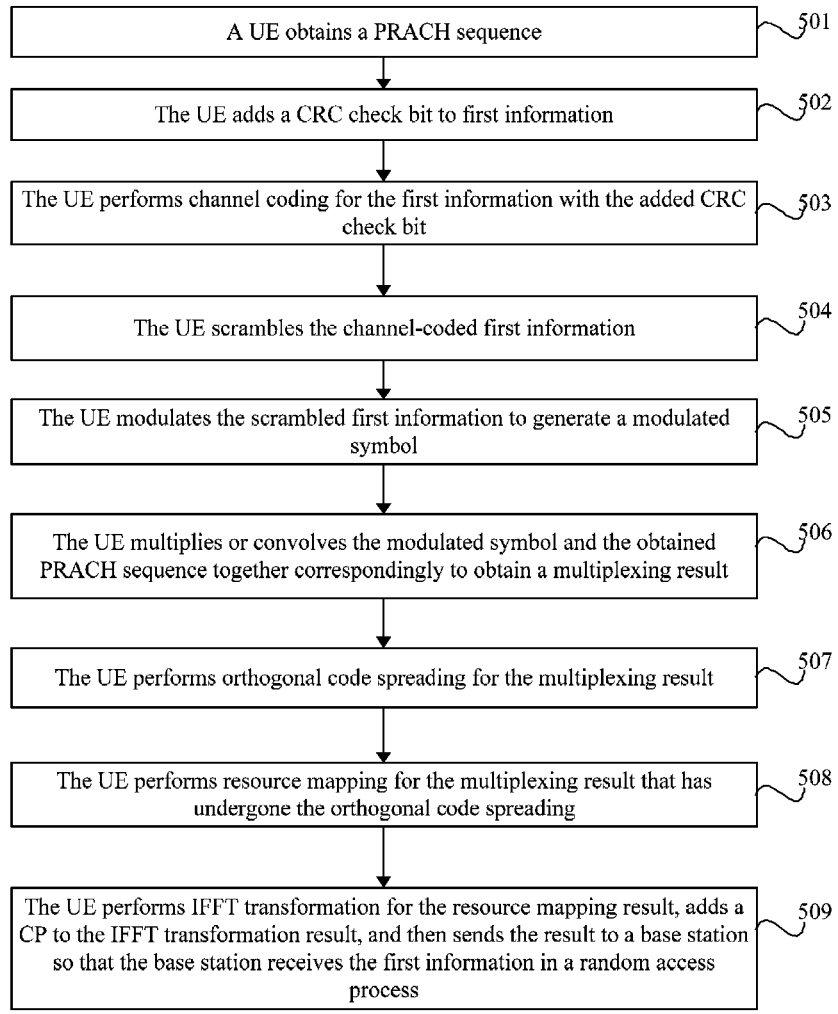
FIG. 5 is a flowchart of a contention-based random access method according to another embodiment of the present invention.

FIG. 5 is a flowchart of a contention-based random access method according to another embodiment of the present invention. This embodiment may be implemented based on the embodiments described above. As shown in FIG. 5, the method includes:

Step 501: The UE obtains the PRACH sequence.

Step 502: The UE adds the CRC check bit to the first information.

Step 503: The UE performs the channel coding for the first information with the added CRC check bit.

Step 504: The UE scrambles the channel-coded first information.

A scrambling sequence used in the scrambling is generated according to a timeslot number or a subframe number or a cell identifier.

Step 505: The UE modulates the scrambled first information to generate the modulated symbol.

Step 506: The UE multiplies or convolves the modulated symbol and the obtained PRACH sequence together correspondingly to obtain the multiplexing result.

Step 507: The UE performs the orthogonal code spreading for the multiplexing result.

Step 508: The UE performs the resource mapping for the multiplexing result that has undergone the orthogonal code spreading.

Step 509: The UE performs the IFFT transformation for the resource mapping result, adds the CP to the IFFT transformation result, and then sends the result to the base station so that the base station receives the first information in the random access process.

In this embodiment, the UE scrambles the first information to randomize interference.

Figure 6A:
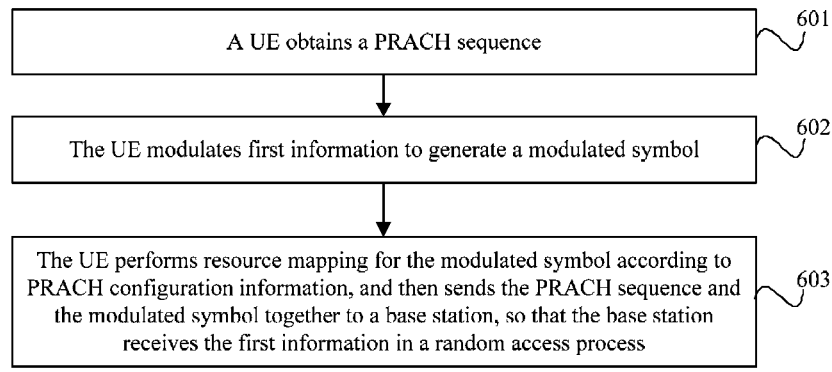
FIG. 6A is a flowchart of a contention-based random access method according to another embodiment of the present invention.

FIG. 6A is a flowchart of a contention-based random access method according to another embodiment of the present invention. As shown in FIG. 6A, the method in this embodiment includes:

Step 601: A UE obtains a PRACH sequence.

For this step, reference may be made to the description about step 201, and no repeated description is given here any further.

Step 602: The UE modulates first information to generate a modulated symbol.

In this embodiment, the UE implements other services at the same time when performing contention-based random access. In this embodiment, the data of other services implemented by the UE at the same time is recorded as first information. For example, the first information may be one or a combination of an RRC request, a BSR, a shared channel, and control signaling.

In this embodiment, the UE determines the first information according to the implemented services. After determining the first information, the UE modulates the first information to generate a modulated symbol. The UE may modulate the first information by using a modulation scheme such as QPSK, 16QAM, or 64QAM, so as to generate the modulated symbol.

Step 603: The UE performs resource mapping for the modulated symbol according to PRACH configuration information, and then sends the PRACH sequence and the modulated symbol together to a base station so that the base station receives the first information in a random access process.

In this embodiment, after obtaining the PRACH sequence, the UE performs resource mapping for the PRACH sequence so as to send the PRACH sequence to the base station.

In the process of resource mapping for the PRACH sequence, according to the PRACH configuration information, the UE performs resource mapping for the modulated symbol derived from modulation of the first information. The PRACH configuration mainly includes the PRACH sequence used in the random access and/or resource mapping information of the PRACH sequence. This implementation manner is mainly time division multiplexing and frequency division multiplexing for the first information and the PRACH sequence.

An implementation manner of the UE performing resource mapping for the modulated symbol according to PRACH configuration information includes: determining, by the UE, a mapping start point of the modulated symbol in a time domain and/or a frequency domain according to the PRACH sequence and/or the resource mapping information of the PRACH sequence, and then performing resource mapping for the modulated symbol in the time domain and/or the frequency domain according to the determined mapping start point in the time domain and/or the frequency domain.

The UE may perform resource mapping for the modulated symbol according to only the PRACH sequence. For example, the UE may directly map the modulated symbol onto the resource location corresponding to the PRACH sequence obtained by the UE. In this implementation manner, the start point of the resource location corresponding to the PRACH sequence is the mapping start point of the modulated symbol in the time domain and the frequency domain.

The UE may also perform resource mapping for the modulated symbol according to only the resource mapping location of the PRACH sequence regardless of the PRACH sequence. For example, the UE may map the modulated symbol to a location behind the resource locations of all PRACH sequences or the resource location of a specified PRACH sequence.

In this embodiment, the UE determines the mapping location of the modulated symbol in the time domain and/or frequency domain according to the PRACH sequence and/or the mapping of the PRACH sequence in the time domain or frequency domain, which avoids conflict with the PRACH sequence.

In addition, in practical application, the PRACH sequence may be long or short. For example, PRACH sequences of two lengths exist in the prior art, where one length is 839 and the other length is 139. In this embodiment, "according to the PRACH sequence" mainly refers to: determining a mapping relationship between the modulated symbol and the PRACH sequence in the time domain according to the length of the PRACH sequence. If the length of the PRACH sequence is 839, the PRACH sequence occupies a long time in the time domain, and the UE may map the PRACH sequence and the modulated symbol onto at least two subframes. If the length of the PRACH sequence is 139, the PRACH sequence occupies few time resources in the time domain, and the UE may map the PRACH sequence and the modulated symbol onto the same subframe.

It should be noted that in this embodiment, the length of the PRACH sequence is not limited to 839 and 139. In the embodiment of the present invention, the length of the PRACH sequence may be fixed or adjustable. For example, the length of the PRACH sequence may be configured by means of higher layer signaling, dynamic signaling, a broadcast message, or the like. Specifically, the UE receives the higher layer signaling or the dynamic signaling or the broadcast message, and configures the length of the PRACH sequence as indicated by the higher layer signaling, the dynamic signaling, or the broadcast message.

Figure 6B:
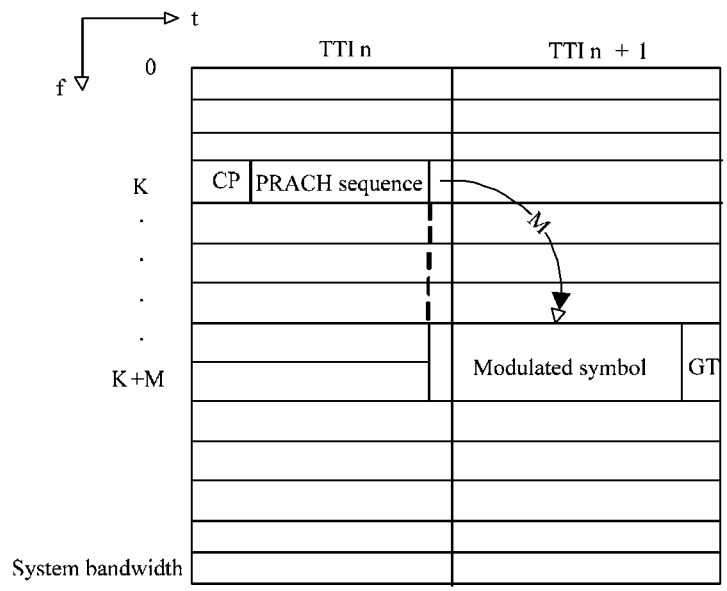
FIG. 6B is a schematic diagram of a first resource mapping status according to another embodiment of the present invention.
Figure 6C:
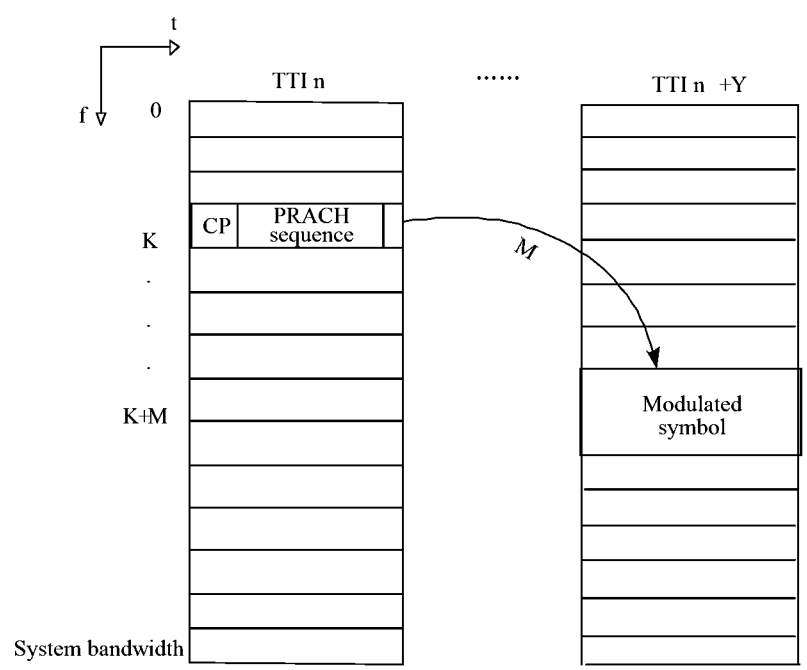
FIG. 6C is a schematic diagram of a second resource mapping status according to another embodiment of the present invention.

The UE may use one of the following processes to determine a mapping start point of the modulated symbol in a time domain according to the PRACH sequence and the resource mapping information of the PRACH sequence, and then performs resource mapping for the modulated symbol in the time domain according to the determined mapping start point in the time domain:

Process 1: The UE determines that an end time point of a subframe mapped from the PRACH sequence is a mapping start point of the modulated symbol in the time domain, and then maps the modulated symbol onto at least two subframes. The mapping status is shown in FIG. 6B. In this implementation manner, the PRACH sequence may have a length of 839 or a length of 139 or an adjustable length, and the length is not limited. If the length of the PRACH sequence is adjustable, the PRACH sequence may be a sequence of a sounding signal (sounding). Process 2: The UE determines that a time point at a specified interval after the subframe mapped from the PRACH sequence is the mapping start point of the modulated symbol in the time domain, and then maps the modulated symbol onto at least one subframe. For example, if the PRACH sequence is mapped to subframe K and the pre-specified interval is M subframes, subframe n+Y is the mapping start point of the modulated symbol in the time domain, and the time domain resources (that is, subframes) allocated to the modulated symbol begin with subframe K+M. The mapping status is shown in FIG. 6C. This implementation manner does not limit the length of the PRACH sequence and whether the length is fixed.

Figure 6D:
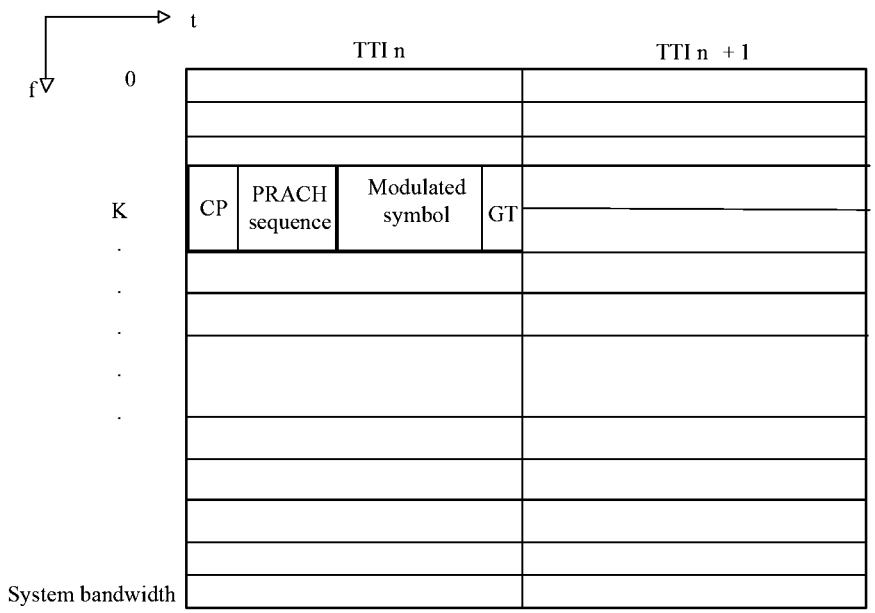
FIG. 6D is a schematic diagram of a third resource mapping status according to another embodiment of the present invention.

Process 3: The UE determines that an end time point of a subframe mapped from the PRACH sequence is a mapping start point of the modulated symbol in the time domain, and then maps the modulated symbol and the PRACH sequence onto the same subframe. The mapping status is shown in FIG. 6D. That is, the UE maps the PRACH sequence and the modulated symbol onto the same subframe, and sends them to the base station. In this implementation manner, the PRACH sequence is preferably a short sequence. For example, the PRACH sequence may be a short sequence in the prior art, or a newly defined short sequence.

In FIG. 6B to FIG. 6D, the horizontal coordinate is time (t), the vertical coordinate is frequency (f), TTI represents a subframe, and the illustrated maximum frequency is the system bandwidth.

In step 603, after performing resource mapping for the modulated symbol and the PRACH sequence, the UE may perform IFFT for each resource mapping result, and then add a CP to the IFFT transformation result and send the result to the base station.

In this embodiment, steps 602 to 603 may be regarded as a specific implementation manner of step 102.

In this embodiment, the UE performs resource mapping for the PRACH sequence and the modulated symbol derived from modulation of the first information, correlates the mapping of the modulated symbol derived from modulation of the first information with the resource mapping process of the PRACH sequence, and therefore, the sent PRACH sequence carries the first information, and the UE can receive the first information in a random access process, which improves transmission efficiency of the first information. This embodiment is simple and easy to implement.

Optionally, in the embodiment shown in FIG. 6A, before modulating the first information, the UE may perform channel coding, add a CRC check bit, perform scrambling, or the like for the first information, which improves transmission performance of the first information.

Optionally, in the embodiment shown in FIG. 6A, after modulating the first information and obtaining the modulated symbol, the UE may perform orthogonal code spreading for the modulated symbol; or, after performing IFFT transformation for the resource mapping result, the UE may perform orthogonal code spreading for the IFFT transformation result to multiplex more users.

Figure 7:
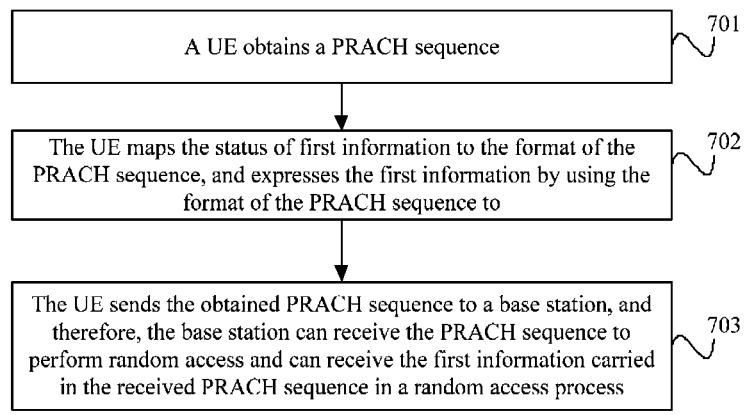
FIG. 7 is a flowchart of a contention-based random access method according to another embodiment of the present invention.

FIG. 7 is a flowchart of a non-contention-based random access method according to another embodiment of the present invention. As shown in FIG. 7, the method in this embodiment includes:

Step 701: A UE obtains a PRACH sequence.

For a contention-based random access method, step 201 specifically means that the UE selects a PRACH sequence locally at random.

Step 702: The UE maps the status of first information to the format of the PRACH sequence, and expresses the first information by using the format of the PRACH sequence.

In this embodiment, the UE implements other services at the same time when performing contention-based random access. In this embodiment, the data of other services implemented by the UE at the same time is recorded as first information. For example, the first information may be one or a combination of an RRC request, a BSR, a shared channel, and control signaling.

In this embodiment, the UE maps the status of the first information corresponding to different services to different PRACH sequences (that is, the format of the PRACH sequence), and expresses the first information by using the format of the PRACH sequence. For example, if the UE transmits the first information by using N bits, the N bits can represent the first information in a total of 2N statuses, and the UE maps the first information in each status to a PRACH sequence. Assuming N=6, then 6 bits can represent a total of $2^6=64$ kinds of first information: (0, 0, 0, 0, 0, 0), (0, 0, 0, 0, 0, 1), . . . , and (1, 1, 1, 1, 1, 1). The UE will map (0, 0, 0, 0, 0, 0), (0, 0, 0, 0, 0, 1), . . . , and (1, 1, 1, 1, 1, 1) to PRACH sequence 0, PRACH sequence 1, . . . , and PRACH 63 respectively in a one-to-one relationship.

Based on the above mapping relationship, when the UE sends the first information (0, 0, 0, 0, 0, 0) to a base station, the UE sends PRACH sequence 0 to the base station to both implement random access and carry the first information (0, 0, 0, 0, 0, 0) to the base station.

Step 703: The UE sends the obtained PRACH sequence to the base station, and therefore, the base station can receive the PRACH sequence to perform random access and can receive the first information carried in the received PRACH sequence in a random access process.

After mapping the first information to the PRACH sequence, the UE sends the mapped PRACH sequence to the base station. Specifically, the UE performs resource mapping for the PRACH sequence, performs IFFT transformation, adds a CP to a result of the IFFT transformation, and sends the result to the base station.

In this embodiment, the base station and the UE prearrange the mapping relationship between the first information and the PRACH sequence. Therefore, after receiving the PRACH sequence, the base station can identify not only the need of performing a random access process according to the PRACH sequence, but also the first information expressed by the PRACH sequence, that is, the base station receives the first information while receiving the PRACH sequence or performing the random access process.

In this embodiment, steps 702 to 703 may be regarded as a specific implementation manner of step 102.

In this embodiment, the UE maps the status of the first information to the format of the PRACH sequence, and expresses the first information by using the format of the sent PRACH sequence, and therefore, the first information is carried in the sent PRACH sequence, and the base station receives the first information in the random access process, which improves transmission efficiency of the first information. This implementation manner is easy to implement. Because the transmission data amount remains unchanged but the information amount increases, the transmission efficiency is relatively improved.

Optionally, in the embodiment shown in FIG. 7, after performing IFFT transformation for the resource mapping result, the UE performs orthogonal code spreading for the IFFT transformation result to multiplex more users and improve the resource usage rate.

In the above embodiments, after the UE sends the obtained PRACH sequence to the base station and carries the first information when sending the PRACH sequence so that the base station receives the first information in the random access process, at most two of the following operations may be included:

Operation 1: The UE receives an RAR sent by the base station.

After the UE sends a PRACH sequence to the base station to perform random access and carries the first information when sending the PRACH sequence, the base station receives the PRACH sequence and the first information. If the base station receives the PRACH sequence and the first information successfully, the base station returns an RAR to the UE. Correspondingly, the UE receives the RAR sent by the base station.

Operation 2: The UE initiates a scheduling transmission process to the base station to transmit data.

After the UE sends a PRACH sequence to the base station to perform random access and carries the first information when sending the PRACH sequence, the UE may continue to initiate a scheduling transmission process to the base station to continue transmitting data. The type of data transmitted in the scheduling transmission process depends on the type of the first information. If the first information is an RRC request, the data transmitted in the scheduling transmission process is mainly signaling data in other signaling exchange processes than the random access process, or service data. That is, the scheduling transmission process mainly transmits other signaling data or service data. If the first information is data such as shared channel or control signaling, the scheduling transmission process mainly transmits signaling data generated in creating an RRC connection in the random access process, for example, an RRC request.

Operation 3: The UE receives a random access success message sent by the base station.

After receiving the PRACH sequence and the first information, the base station may send a random access success message to the UE to indicate the random access success to the UE.

In this embodiment, after carrying the first information when sending the PRACH sequence to the base station, the UE continues to receive the RAR returned by the base station, initiates a scheduling transmission process to the base station, and receives the random access success message sent by the base station. In this way, the entire random access process is complete. With the first information transmitted in the random access process, the base station receives the first information in the random access process, which saves operation steps of transmitting the first information and improves efficiency of the first information no matter whether the first information is signaling data or service data.

Further, in the contention-based random access method provided in all embodiments described above, the services implemented by the UE in the random access process are preferably services of small packets, that is, the data amount of the services is small. Therefore, before the UE sends a PRACH sequence to the base station and carries the first information when sending the PRACH sequence so that the base station receives the first information in the random access process, the UE may determine whether the data amount (that is, size) of the first information is less than a preset threshold, that is, determine whether the service corresponding to the first information is a service of small packets. If the UE determines that the data amount of the first information is less than the preset threshold, it indicates that the service corresponding to the first information is a service of small packets, and therefore, the UE performs the operation of sending a PRACH sequence to the base station and carrying the first information when sending the PRACH sequence so that the base station receives the first information in the random access process. If the UE determines that the data amount of the first information is greater than or equal to the preset threshold, it indicates that the service corresponding to the first information is not a service of small packets, and therefore, the UE uses the prior art to complete the random access process and then implements the service.

For example, assuming that the data amount of the first information is L bits and the set threshold is X bits, if L<X, it indicates that the service corresponding to the first information is a service of small packets; conversely, it indicates that the service corresponding to the first information is a not service of small packets.

Generally, services of a large data amount are not suitable for transmission in a random access process, and have a low success rate of transmission. Therefore, the UE in this embodiment predetermines whether the service corresponding to the first information is a service of small packets, and transmits the first information in the random access process only if determining that the service corresponding to the first information is a service of small packets, which improves the success rate of transmitting the first information.

Further, before determining whether the data amount of the first information is less than the preset threshold, the UE may determine the data amount of the first information. The UE may determine the data amount of the first information according to the scheduling information of the base station, that is, the data amount of the first information is notified by the base station to the UE by means of the scheduling information. In this implementation manner, the UE does not need to notify the data amount of the first information to the base station.

In the embodiment of the present invention, the UE may not only determine the data amount of the first information according to the scheduling information of the base station, but also determine the data amount of the first information on its own initiative. For example, according to the PRACH configuration, the UE determines the data amount of the first information that can be carried in the random access process. In this implementation manner, the base station does not know the data amount of the first information, and therefore, the UE uses the sent PRACH sequence to also carry the data amount of the first information so that the base station knows the size of the first information and can receive the first information successfully.

Figure 8:
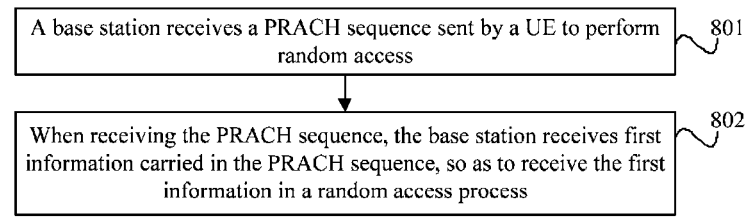
FIG. 8 is a flowchart of a random access method according to another embodiment of the present invention.

FIG. 8 is a flowchart of a random access method according to another embodiment of the present invention. As shown in FIG. 8, the method in this embodiment includes:

Step 801: A base station receives a PRACH sequence sent by a UE to perform random access.

Step 802: When receiving the PRACH sequence, the base station receives first information carried in the PRACH sequence, so as to receive the first information in a random access process.

The first information includes one or a combination of an RRC request, a BSR, a shared channel, and control signaling.

In this embodiment, the base station collaborates with the UE and receives the first information sent by the UE in the random access process. Compared with the prior art, this embodiment saves the operation steps of receiving the first information and improves the receiving efficiency.

Further, after receiving the PRACH sequence and the first information, the base station may perform at most two of the following operations:

Operation 1: The base station sends an RAR to the UE.

After receiving the PRACH sequence and the first information successfully, the base station may send an RAR to the UE to indicate the successful receiving of the PRACH sequence and the first information.

Operation 2: The base station receives data sent by the UE in a scheduling transmission process.

After the UE sends a PRACH sequence to the base station to perform random access and carries the first information when sending the PRACH sequence, the UE may continue to initiate a scheduling transmission process to the base station to continue transmitting data. Therefore, the base station receives the data sent in the scheduling transmission process.

Operation 3: The base station sends a random access success message to the UE.

After receiving the PRACH sequence and the first information, the base station determines completion and success of the random access process, and, in this scenario, the base station may send a random access success message to the UE to indicate the random access success to the UE.

Figure 9:
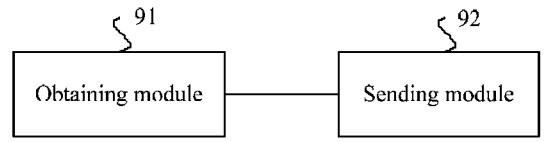
FIG. 9 is a schematic structural diagram of a UE according to an embodiment of the present invention.

FIG. 9 is a schematic structural diagram of a UE according to an embodiment of the present invention. As shown in FIG. 9, the UE in this embodiment includes an obtaining module 91 and a sending module 92.

The obtaining module 91 is adapted to obtain a PRACH sequence. The sending module 92 is connected with the obtaining module 91, and is adapted to send the PRACH sequence obtained by the obtaining module 91 to a base station to perform random access, and carry first information when sending the PRACH sequence so that the base station receives the first information in a random access process.

The first information may include one or a combination of an RRC request, a BSR, a shared channel, and control signaling.

The function modules of the UE in this embodiment may be used to implement the procedure of the random access method shown in FIG. 1, and their detailed working principles are not detailed here any further. For details, see the description in the method embodiment.

The UE in this embodiment carries the first information when sending the PRACH sequence to the base station so that the base station receives the first information in the random access process. If the first information is signaling data, by transmitting signaling data in the random access process, the UE in this embodiment reduces signaling exchange, saves the signaling overhead and delay, and improves the data transmission efficiency; if the first information is service data, by transmitting service data in the random access process, the UE in this embodiment makes it unnecessary to transmit the service data after completion of the signaling exchange and also improves the data transmission efficiency.

Figure 10:
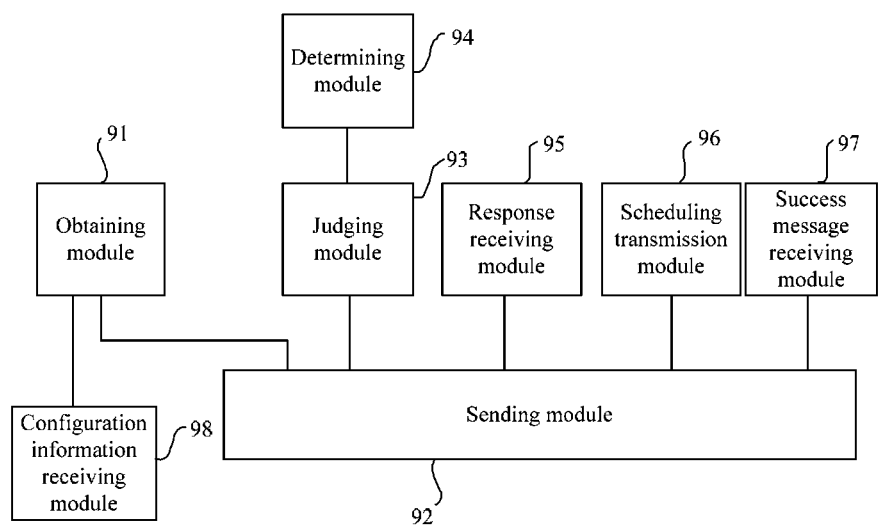
FIG. 10 is a schematic structural diagram of a UE according to another embodiment of the present invention.

FIG. 10 is a schematic structural diagram of a UE according to another embodiment of the present invention. This embodiment is implemented based on the embodiment shown in FIG. 9. As shown in FIG. 10, the UE in this embodiment further includes a configuration information receiving module.

The configuration information receiving module 98 is adapted to receive the PRACH configuration information that is sent by the base station and intended for use when the UE carries the first information when sending the PRACH sequence. The obtaining module 91 is specifically adapted to obtain the PRACH sequence according to the PRACH configuration information received by the configuration information receiving module. Optionally, the configuration information receiving module 98 is connected with the obtaining module 91.

The sending module 92 in this embodiment is specifically adapted to multiplex the first information and the PRACH sequence so that the base station receives the first information in the random access process.

The sending module 92 in this embodiment is further adapted to: before multiplexing the first information and the PRACH sequence, perform at least one of CRC bit addition, channel coding, scrambling, and modulation for the first information.

If the sending module 92 performs scrambling for the first information, a scrambling sequence used in the scrambling is preferably generated according to a timeslot number or a subframe number or a cell identifier.

If the sending module 92 performs channel coding for the first information, the sending module 92 may specifically perform channel coding for the first information by means of RM coding, diagonal modulation and coding, convolutional coding, or Turbo coding.

Preferably, the sending module 92 is specifically adapted to modulate the first information to generate a modulated symbol. For example, the sending module 92 is specifically adapted to modulate the first information by using a modulation scheme such as QPSK, 16QAM, 64QAM, or a modulation scheme corresponding to the PRACH configuration, so as to generate the modulated symbol.

The sending module 92 in this embodiment may be further adapted to: after multiplexing the first information and the PRACH sequence, perform at least one of orthogonal code spreading, Fourier transformation, resource mapping, IFFT, and cyclic prefix addition for the multiplexing result of the first information and the PRACH sequence, and send a result of the at least one operation for the multiplexing result to the base station so that the base station receives the first information in the random access process.

Preferably, the sending module 92 may be specifically adapted to perform IFFT transformation for the multiplexing result, and then add a CP to an IFFT transformation result.

The sending module 92 may be more specifically adapted to add a CP, which is different from those of other IFFT transformation results, before at least one IFFT transformation result. For example, the sending module 92 may add a first CP before a first IFFT transformation result, and add no CP before other IFFT transformation results. For another example, the sending module 92 may add the first CP before the first IFFT transformation result, and add a second CP before other IFFT transformation results respectively, where the first CP and the second CP have the same or different lengths.

Further, if the sending module 92 performs orthogonal code spreading for the multiplexing result, the sending module 92 may specifically perform orthogonal code spreading for the multiplexing result by repeatedly using the same orthogonal code block.

Further, if the sending module 92 performs resource mapping for the multiplexing result, the sending module 92 may specifically perform resource mapping for the multiplexing result in a frequency domain first and in a time domain later. More specifically, the sending module 92 may map the multiplexing result onto discontinuous subcarriers. Further, preferably, in the frequency domain, the sending module 92 may map the multiplexing result onto at least one discontinuous subcarrier in a frequency hopping manner. In the time domain, the sending module 92 may map the multiplexing result onto one timeslot, one subframe, or multiple subframes, where the multiple subframes are multiple continuous subframes or multiple subframes that are at least one subframe apart.

Further, if the PRACH sequence obtained by the obtaining module 91 in a specific resource includes multiple same PRACH sequences, the sending module 92 may be specifically adapted to multiply each modulated symbol by one PRACH sequence in the multiple same PRACH sequences; or if the PRACH sequence obtained by the obtaining module 91 in a specific resource includes multiple different PRACH sequences, the sending module 92 may be specifically adapted to multiply each modulated symbol by one PRACH sequence in the multiple different PRACH sequences; or if the PRACH sequence obtained by the obtaining module 91 in a specific resource includes multiple different PRACH sequences and at least one PRACH sequence is not multiplied by the modulated symbol, the sending module 92 may be specifically adapted to multiply each modulated symbol by one PRACH sequence in the multiple different PRACH sequences, where the one PRACH sequence is one of other PRACH sequences than the PRACH sequences that are not multiplied by the modulated symbol, where the specific resource may be a timeslot, a subframe, or multiple subframes, where the multiple subframes may be multiple continuous subframes or multiple subframes that are at least one subframe apart.

Further, the sending module 92 may be more specifically adapted to avoid multiplying a first PRACH sequence and a last PRACH sequence in the multiple different PRACH sequences by the modulated symbol.

The PRACH configuration information includes the PRACH sequence and/or resource mapping information of the PRACH sequence.

Therefore, the sending module 92 is specifically adapted to determine a mapping start point of the modulated symbol in a time domain and/or a frequency domain according to the PRACH sequence and/or the resource mapping information of the PRACH sequence, and then perform resource mapping for the modulated symbol in the time domain and/or the frequency domain according to the determined mapping start point in the time domain and/or the frequency domain.

Further, in the time domain, the sending module 92 is more specifically adapted to determine that an end time point of a subframe mapped from the PRACH sequence is a mapping start point of the modulated symbol in the time domain, and then map the modulated symbol onto at least two subframes; or the sending module 92 is more specifically adapted to determine that a time point at a specified interval after a subframe mapped from the PRACH sequence is a mapping start point of the modulated symbol in the time domain, and then map the modulated symbol onto at least one subframe; or the sending module 92 is more specifically adapted to determine that an end time point of a subframe mapped from the PRACH sequence is a mapping start point of the modulated symbol in the time domain, and then map the modulated symbol and the PRACH sequence onto the same subframe.

The sending module 92 in this embodiment may be further adapted to map the status of the first information to the format of the PRACH sequence, and express the first information by using the format of the PRACH sequence.

Further, the UE in this embodiment further includes a judging module 93. The judging module 93 is connected with the sending module 92, and is adapted to: determine whether a data amount of the first information is less than a preset threshold, and, if determining that the data amount of the first information is less than the preset threshold, trigger the sending module 92 to perform an operation of carrying the first information when sending the PRACH sequence so that the base station receives the first information in a random access process.

Further, the UE in this embodiment may further include a determining module 94. The determining module 94 is connected with the judging module 93, and is adapted to determine the data amount of the first information according to the PRACH configuration, and deliver a determined result to the judging module 93.

Therefore, the sending module 92 is further adapted to carry the data amount of the first information when sending the PRACH sequence so that the base station knows the data amount of the first information. Optionally, the sending module 92 is further connected with the determining module 94.

Still further, the UE in this embodiment may include any one of the following modules or a combination thereof:

a response receiving module 95, adapted to: after the sending module 92 carries the first information when sending the PRACH sequence and sends the PRACH sequence to the base station, receive a random access response RAR sent by the base station;

a scheduling transmission module 96, adapted to: after the sending module 92 carries the first information when sending the PRACH sequence and sends the PRACH sequence to the base station, initiate a scheduling transmission process to the base station to transmit data; and a success message receiving module 97, adapted to: after the sending module 92 carries the first information when sending the PRACH sequence and sends the PRACH sequence to the base station, receive a random access contention success message sent by the base station.

Optionally, the response receiving module 95, the scheduling transmission module 96, and the success message receiving module 97 are connected with the sending module 92.

Still further, the UE in this embodiment may include a configuring module. The configuring module 98 is adapted to receive higher layer signaling or dynamic signaling or a broadcast message, and configure the length of the PRACH sequence as indicated by the higher layer signaling or the dynamic signaling or the broadcast message.

The function modules or submodules described above may be used to implement corresponding procedures in the embodiment shown in any one of FIG. 2A and FIG. 3A to FIG. 7, and their detailed working principles are not detailed here any further. For details, see the description in the method embodiment.

The UE in this embodiment carries the first information when sending the PRACH sequence to the base station so that the base station receives the first information in the random access process. If the first information is signaling data, by transmitting signaling data in the random access process, the UE in this embodiment reduces signaling exchange, saves the signaling overhead and delay, and improves the data transmission efficiency; if the first information is service data, by transmitting service data in the random access process, the UE in this embodiment makes it unnecessary to transmit the service data after completion of the signaling exchange and also improves the data transmission efficiency.

Figure 11:
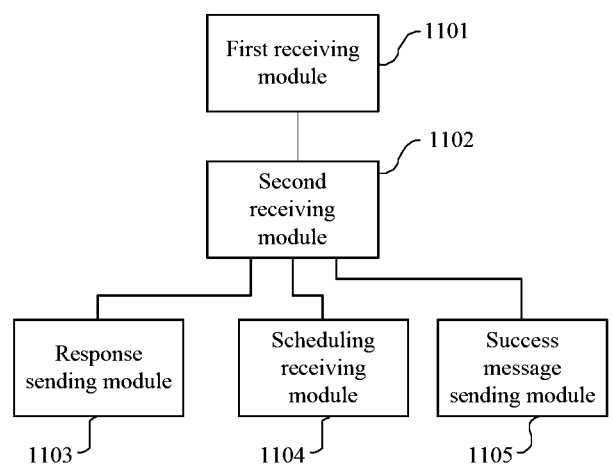
FIG. 11 is a schematic structural diagram of a base station according to an embodiment of the present invention.

FIG. 11 is a schematic structural diagram of a base station according to an embodiment of the present invention. As shown in FIG. 11, the base station in this embodiment includes a first receiving module 1101 and a second receiving module 1102.

The first receiving module 1101 is adapted to receive a PRACH sequence sent by a UE to perform random access.

The second receiving module 1102 is connected with the first receiving module 1101, and is adapted to: when the first receiving module 1101 receives the PRACH sequence, receive first information carried in the PRACH sequence, so as to receive the first information in the random access process.

The first information includes one or a combination of an RRC request, a BSR, a shared channel, and control signaling.

Further, the base station in this embodiment may include any one of the following modules or a combination thereof:

a response sending module 1103, adapted to: after the second receiving module 1102 receives the first information carried in the PRACH sequence, send a random access response RAR to the UE;

a scheduling receiving module 1104, adapted to: after the second receiving module 1102 receives the first information carried in the PRACH sequence, receive data sent by the UE in a scheduling transmission process; and a success message sending module 1105, adapted to: after the second receiving module 1102 receives the first information carried in the PRACH sequence, send a random access success message to the UE.

The function modules of the base station in this embodiment may be used to implement the procedure of the random access method shown in FIG. 8, and their detailed working principles are not detailed here any further. For details, see the description in the method embodiment.

By collaborating with the UE provided in the embodiments of the present invention, the base station in this embodiment receives the first information in the PRACH sequence when receiving the PRACH sequence sent by the UE. If the first information is signaling data, by transmitting other signaling in the random access process, the base station in this embodiment can reduce signaling exchange, save the signaling overhead and delay, and improve data transmission efficiency; if the first information is service data, by transmitting service data in the random access process, the base station in this embodiment can make it unnecessary to transmit the service data after completion of the signaling exchange and also improves the data transmission efficiency.

Persons of ordinary skill in the art may understand that, all or a part of the steps of the foregoing method embodiments may be implemented by a program instructing relevant hardware. The aforementioned program may be stored in a computer readable storage medium. When the program runs, the steps of the forgoing method embodiments are performed. The storage medium includes any medium capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

What is claimed is:

1. A random access method, comprising:

obtaining, by a user equipment (UE), a physical random access channel (PRACH) preamble sequence;

modifying, by the UE, the PRACH preamble sequence to carry a first information, wherein the first information comprises one or a combination of a radio resource control (RRC) request and a buffer status report (BSR), and wherein modifying includes multiplexing, by the UE, the first information and the PRACH preamble sequence to produce a multiplexed PRACH preamble sequence carrying the first information; and sending, by the UE, the multiplexed PRACH preamble sequence carrying the first information to a base station to perform uplink random access, to enable the base station to receive the first information in an uplink random access process, wherein before the multiplexing, by the UE, the first information and the PRACH preamble sequence, the method further comprises:
    performing, by the UE, at least one of cyclical redundancy check (CRC) bit addition, channel coding, scrambling, and modulation for the first information;

wherein after the multiplexing, by the UE, the first information and the PRACH preamble sequence, the method further comprises:
    performing, by the UE, at least one of orthogonal code spreading, Fourier transformation, resource mapping, inverse fast Fourier transformation (IFFT), and cyclic prefix addition on the multiplexed PRACH preamble sequence carrying the first information to produce a processed multiplexing result; and wherein the sending, by the UE, the multiplexed PRACH preamble sequence carrying the first information to the base station comprises:
    sending, by the UE, the processed multiplexing result to the base station.

2. The random access method according to claim 1, wherein: before the multiplexing, by the UE, the first information and the PRACH preamble sequence, the method further comprises:
    modulating, by the UE, the first information to generate a modulated symbol; and
    the multiplexing, by the UE, the first information and the PRACH preamble sequence comprises:
        multiplying or convolving, by the UE, the modulated symbol and the PRACH preamble sequence together.

3. The random access method according to claim 1, wherein: a scrambling sequence used in the scrambling is generated according to a timeslot number or a subframe number or a cell identifier.

4. The random access method according to claim 1, wherein: the modifying the PRACH preamble sequence comprises:
    expressing, by the UE, the first information using a format of the PRACH preamble sequence.

5. A random access method, comprising:
receiving, by a base station, a multiplexed physical random access channel (PRACH) preamble sequence sent by a user equipment (UE) to perform uplink random access, the multiplexed PRACH preamble sequence including a PRACH preamble sequence multiplexed with a first information, wherein the first information comprises one or a combination of a radio resource control (RRC) request and a buffer status report (BSR); and
receiving, by the base station when receiving the multiplexed PRACH preamble sequence, the first information carried in the multiplexed PRACH preamble sequence,
wherein before multiplexing the first information and the PRACH preamble sequence, the UE performs at least one of cyclical redundancy check (CRC) bit addition, channel coding, scrambling, and modulation for the first information;
wherein after the multiplexing the first information and the PRACH preamble sequence, the UE performs at least one of orthogonal code spreading, Fourier transformation, resource mapping, inverse fast Fourier transformation (IFFT), and cyclic prefix addition on the multiplexed PRACH preamble sequence carrying the first information to produce a processed multiplexing result; and
wherein the multiplexed PRACH preamble sequence received by the base station comprises the processed multiplexing result.

6. A user equipment, comprising a processor and a processor-readable medium having processor-executable instructions stored thereon, the processor-executable instructions including a plurality of modules, the modules including:
    an obtaining module, adapted to obtain a physical random access channel (PRACH) preamble sequence; and
    a sending module, adapted to modify the PRACH preamble sequence to carry a first information by multiplexing the first information and the PRACH preamble sequence to produce a multiplexed PRACH preamble sequence carrying the first information, wherein the first information comprises one or a combination of a radio resource control (RRC) request and a buffer status report (BSR), and adapted to send the multiplexed PRACH preamble sequence carrying the first information to a base station to perform uplink random access, to enable the base station to receive the first information in an uplink random access process,
wherein before the multiplexing the first information and the PRACH preamble sequence, the sending module is further configured to:
    perform at least one of cyclical redundancy check (CRC) bit addition, channel coding, scrambling, and modulation for the first information;
wherein after the multiplexing the first information and the PRACH preamble sequence, the sending module is further configured to:
    perform at least one of orthogonal code spreading, Fourier transformation, resource mapping, inverse fast Fourier transformation (IFFT), and cyclic prefix addition on the multiplexed PRACH preamble sequence carrying the first information to produce a processed multiplexing result; and
wherein the sending, by the sending module, the multiplexed PRACH preamble sequence carrying the first information to the base station comprises:
    sending the processed multiplexing result to the base station.

7. The user equipment according to claim 6, wherein the sending module is adapted to modulate the first information to generate a modulated symbol; and wherein the multiplexing the first information and the PRACH preamble sequence includes multiplying or convolving the modulated symbol and the PRACH preamble sequence together.

8. The user equipment according to claim 6, wherein: a scrambling sequence used in the scrambling is generated according to a timeslot number or a subframe number or a cell identifier.

9. The user equipment according to claim 6, wherein the sending module is adapted to express the first information using a format of the PRACH preamble sequence.

10. A base station, comprising a processor and a processor-readable medium having processor-executable instructions stored thereon, the processor-executable instructions including a plurality of modules, the modules including:
    a first receiving module, adapted to receive a multiplexed physical random access channel (PRACH) preamble sequence sent by a user equipment (UE) to perform uplink random access, the multiplexed PRACH preamble sequence including a PRACH preamble sequence multiplexed with a first information, wherein the first information comprises one or a combination of a radio resource control (RRC) request and a buffer status report (BSR); and a second receiving module, adapted to: when the first receiving module receives the multiplexed PRACH preamble sequence, receive first information carried in the multiplexed PRACH preamble sequence, wherein before multiplexing the first information and the PRACH preamble sequence, the UE performs at least one of cyclical redundancy check (CRC) bit addition, channel coding, scrambling, and modulation for the first information;

wherein after the multiplexing the first information and the PRACH preamble sequence, the UE performs at least one of orthogonal code spreading, Fourier transformation, resource mapping, inverse fast Fourier transformation (IFFT), and cyclic prefix addition on the multiplexed PRACH preamble sequence carrying the first information to produce a processed multiplexing result; and wherein the multiplexed PRACH preamble sequence received by the first receiving module comprises the processed multiplexing result.

* * * * *